United States Patent [19]

Harris et al.

[11] Patent Number: 5,103,393
[45] Date of Patent: Apr. 7, 1992

[54] METHOD OF DYNAMICALLY ALLOCATING PROCESSORS IN A MASSIVELY PARALLEL PROCESSING SYSTEM

[75] Inventors: Jonathan P. Harris, Littleton; Daniel Leibholz, Watertown; Brad Miller, Westborough, all of Mass.

[73] Assignee: Digital Equipment Corporation, Maynard, Mass.

[21] Appl. No.: 545,857

[22] Filed: Jun. 29, 1990

[51] Int. Cl.⁵ .................. G06F 15/16; G06F 13/00
[52] U.S. Cl. ............................. 395/650; 364/280; 364/281.3; 364/281; 364/281.6; 364/229; 364/229.5; 364/DIG. 1
[58] Field of Search ... 364/200 MS File, 900 MS File

[56] References Cited

U.S. PATENT DOCUMENTS

| | | | |
|---|---|---|---|
| 4,380,046 | 4/1983 | Fung | 364/200 |
| 4,644,461 | 2/1987 | Jennings | 364/200 |
| 4,847,755 | 7/1989 | Morrison et al. | 364/200 |
| 4,930,102 | 5/1990 | Jennings | 364/900 |

Primary Examiner—Kevin A. Kriess
Attorney, Agent, or Firm—Cesari & McKenna

[57] ABSTRACT

An "n" dimensional mesh-connected massively parallel processing system uses pointers to connect requesting processors to allocated processors, and also, to access the allocated processors. The requesting and allocated processors are connected by (i) storing in the requesting processor or in a system controller a pointer which points to the allocated processors as a group and (ii) storing in each of the allocated processors, in a designated memory location, an assigned-marker, or an identifier which identifies the processor as a member of the identified group. When one or more requesting processors require connection to free processors, a request is sent to each processor in the system asking each of them to determine if it is free. Each of the processors which is free then assigns itself indices relating to its position in the mesh and its position relative to other free processors. Each free processor sends its indices to a rendezvous processor associated with the requesting processors, and the rendezvous processor allocates the free processors to a requesting processor based on the connection requirements of that requesting processor and the indices. If several requesting processors request connection to blocks of free processors, the rendezvous processor allocates non-overlapping blocks by assigning to the requesting processors only those free processors with indices which are modulo the associated connection requirement.

16 Claims, 7 Drawing Sheets

FIGURE 1

| MARKER OR IDENTIFIER |
|---|
| $a_1$ |
| MARKER OR IDENTIFIER |
| $a_2$ |
| FREE MARKER |
| $a_3$ |

METHOD OF DYNAMICALLY ALLOCATING PROCESSORS IN A MASSIVELY PARALLEL PROCESSING SYSTEM

FIELD OF INVENTION

The invention relates generally to massively parallel processing systems and more particularly to dynamic allocation of the processors within the systems.

BACKGROUND

Massively parallel processing systems are systems in which processors perform, in parallel, an operation or a series of operations. Each processor thus simultaneously manipulates data stored therein in accordance with instructions associated with the operations. The data may then be transferred, further manipulated or combined, as required. Parallel processing has distinct advantages for many types of data manipulation or computation operations, such as data base management where each entry in a data base may be manipulated in parallel. Such a system, for example, can quickly search a data base.

Massively parallel systems may include tens of thousands, or more, interconnected processors. A theory of the operations of such systems is discussed in Daniel W. Hillis's dissertation entitled "The Connection Machine", published by MIT Press in 1981. Hillis, in his dissertation, theorizes that dynamic allocation of the processors to on-going operations is a desirable feature for such massively parallel processing systems. Thus as a series of operations are being performed in the system, additional processors are allocated to each of them, as needed. In this way, a programmer or a user need not guess how many processors will be required for a particular operation and reserve them. Such reservations restrict the use of the processors to the particular operations and make them unavailable for other operations, whether or not they are actually in use. Also, if these reservations are inaccurate and more processors are required, the operations must be re-started with the proper number of processors allocated.

Dynamic allocation of processors can be analogized to dynamic allocation of memory in conventional systems. To date, known attempts at dynamic allocation of processors in a massively parallel processing system have been made using languages such as LISP. As Hillis explains in his dissertation, processors are allocated using "xectors", each of which correspond to a set of processors with a value stored in each processor. A processor is allocated as part of a xector by assigning to it the associated value for storage. The xectors are then treated as LISP objects. Accordingly, a xector may be included in an operation, which is the same as performing the operation on the data stored in each processor in the set.

Other languages make use of explicit pointers to point to dynamically allocated memory. Thus, the pointers point from one memory location to one or more allocated memory locations. It is desirable to include in a system which uses such a language a mechanism for dynamically allocating processors. The dynamically allocated processors can then be included in various operations using pointers.

DEFINITIONS

The following defined terms are used throughout the remainder of the specification:

"assigned processor" is a processor which is assigned to an operation, and thus, its memory contains an assigned-marker;

"free processor" is a processor which is not assigned to any operation, and thus, its memory contains a free-marker;

"requesting processor" is an assigned processor which requires connection to one or more free processors;

"allocated processor" is a free processor which has been designated as a processor for connection to a particular requesting processor—once the connection is made the allocated processor becomes an assigned processor;

"virtual processors" are single processors which can each operate simultaneously as a number of different, or virtual, processors by subdividing their memories into a number of sections and allocating or assigning each section to a different operation—each section is a processing layer and is thus considered free or assigned depending only on what type of marker, assigned or free, is in the section;

"mesh-connected processing system" is a massively parallel processing system in which processors can communicate with each other as if they are physically connected in a mesh —each processor can thus communicate easily with processors which are considered its neighbors in the mesh, even if the "neighboring" processors are not physically near and/or connected to each other. Such systems include meshes in which the edges are wrapped to create, for example, cylinders, toroids, and so forth.

"rendezvous processor" is a processor which participates in a rendezvous communication scheme (see, Hillis for a further description of rendezvous communication schemes) —the rendezvous processors, which may be free or assigned, ordered according, for example, to their relative locations in the mesh.

SUMMARY

The invention is an "n"-dimensional mesh-connected processing system which uses pointers to connect requesting processors to allocated processors, and also, to access the connected processors, that is, the newly assigned processors, after the connection is made. The system allocates processors in the zero and one dimensional cases in accordance with known methods, and allocates processors in the two to "n" dimensional cases in accordance with a unique "block identification" scheme summarized below. When several individual processors in a particular operational group require connection to blocks of free processors, the system uses a modification of the block identification scheme to locate non-overlapping, appropriately-sized blocks.

The requesting and allocated processors are connected by (i) storing in the requesting processor or in a system controller processor a pointer which points to the allocated processors and (ii) storing in each of the allocated processors, in a designated memory location, an assigned-marker, or an identifier which identifies the processor as a member of the identified group. If there are not enough free processors in a particular layer to satisfy a connection requirement, the system uses a next layer of virtual processors.

Basically, when a requesting processor in the n-dimensional system requires connection to a "g" dimensional block of free processors, where $g \leq n$, for example, a 2-dimensional "d"-by-"e" block of free processors, a request is sent to each free processor asking that it assign itself n numbers, $n=2$ in the example. The free processors each assign themselves a first index, which relates to a first orientation, for example, a "vertical" index, and n-1 indices relating to each of the other dimensions, or orientations, of the system. The indices are based on the processor's position relative to the other free processors in a given dimension. For example, the vertical index corresponds to the number of contiguous free processors in a vertical orientation, such as in a column. Each free processor with a vertical index which is greater than or equal to d, and at least one other index which is greater than or equal to e are the lower right-hand corners of blocks which are at least as large as the requested d-by-e block.

Each lower right-hand corner processor participates in a "minimum-reduction" operation to determine which corner processor has the smallest "block index", where the block index is the product of its locational coordinates, that is, the coordinates that the processor acquires by virtue of its position in the mesh. The corner processor with the smallest block index sends its address to a designated rendezvous processor. The rendezvous processor then allocates the block to the requesting processor by sending to the requesting processor the received corner processor address.

One processor may require simultaneous connection to a number of the d-by-e blocks of free processors, or several processors may each require connection to one of such blocks. In either case, an appropriate number of non-overlapping, d-by-e blocks must be located. Thus only the free processors which have 1-dimensional indices which are modulo d and indices associated with another dimension which are modulo e are considered as corner processors. These processors, which are necessarily associated with non-overlapping blocks, then number themselves and send their addresses to the appropriate rendezvous processors.

BRIEF DESCRIPTION OF THE DRAWINGS

The above and further advantages of the invention may be better understood by referring to the following description in conjunction with the accompanying drawings, in which.

DETAILED DESCRIPTION

A. A MASSIVELY PARALLEL PROCESSOR NETWORK

Figure 1:
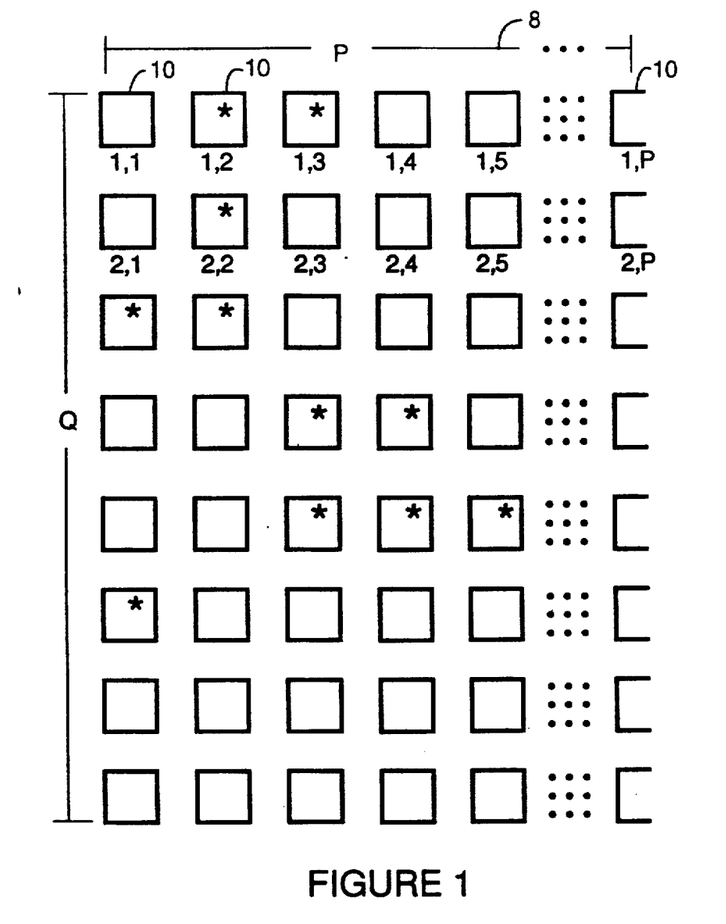
FIG. 1 is a block diagram of a 2-dimensional grid of processors in a massively parallel processing system.

FIG. 1 is a block diagram of a "P"-by-"Q" grid 8 of processors 10 of a two-dimensional massively parallel processing system. Each processor 10 has associated with it two coordinates which correspond to the processor's physical location in the grid, that is, to its location in the mesh. For example, the processor in the upper left-hand corner of the grid 8 has coordinates "1,1" and the processor below it has coordinates "2,1", and so forth. The coordinates associated with the processors 10 in the first two rows are shown in the drawing.

The processors 10 are mesh-connected such that any processor 10 can communicate easily with its neighboring processors. In the drawing, the processors shown above, below and to either side of a given processor are considered the processor's neighbors. A processor 10 is either an assigned processor or a free processor. An assigned processor 10 is denoted in the drawing by an asterisk.

Figure 2:
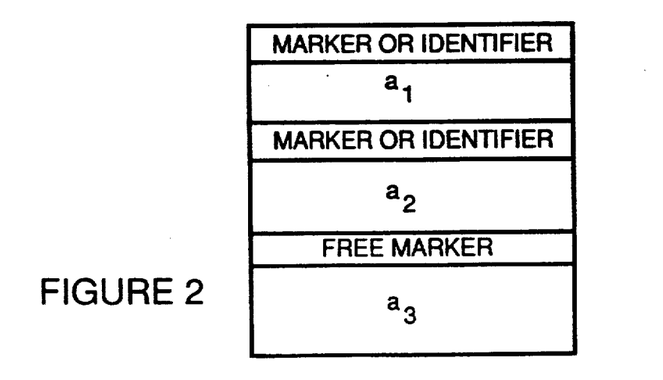
FIG. 2 is a block diagram of a memory of one of the processors shown in FIG. 1.
Figure 3:
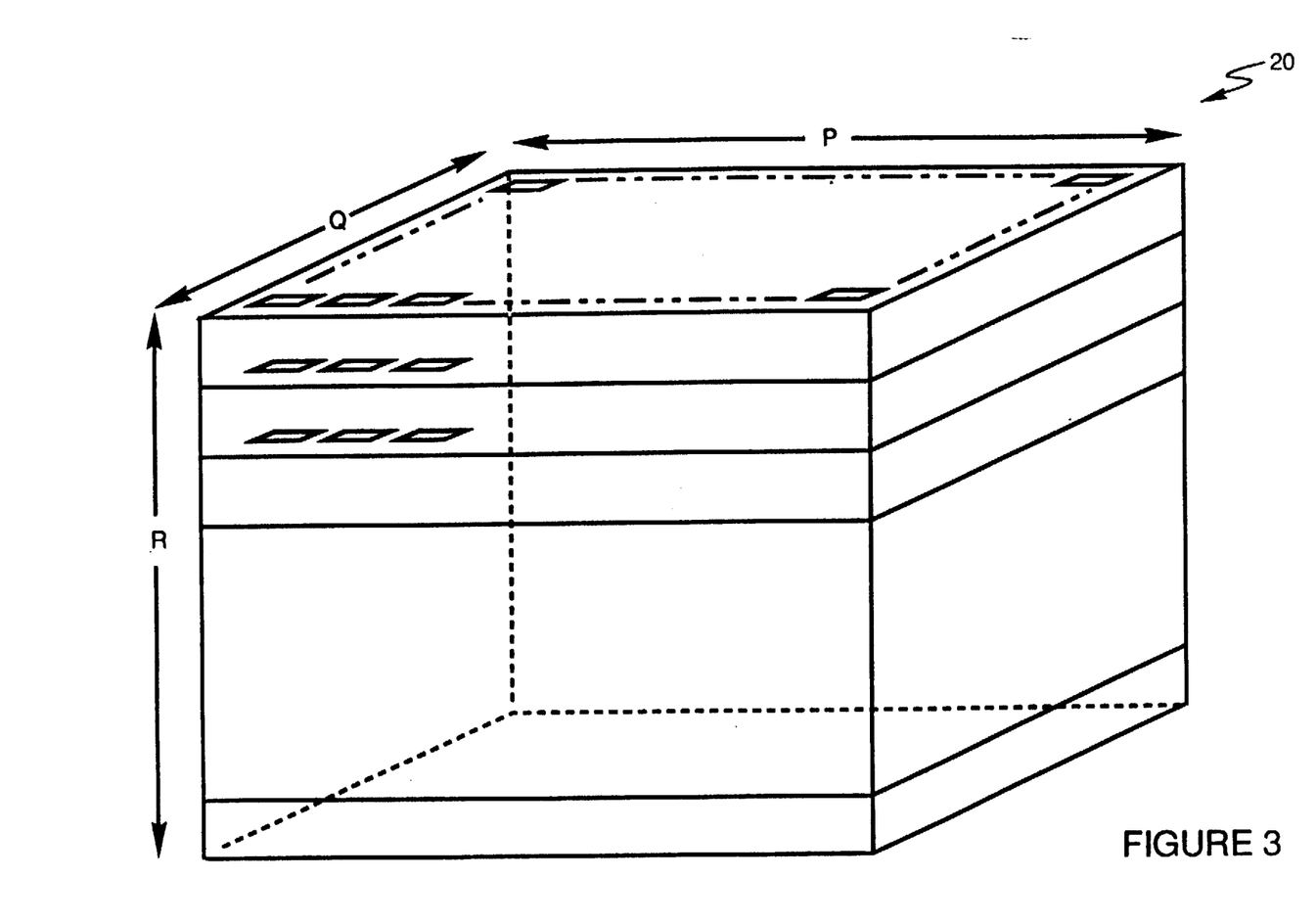
FIG. 3 is a block diagram of a processor network.

Referring now to FIG. 2, the memory 100 of one of the processors 10 is depicted. The memory 100 is subdivided into a number of sections $a_1, a_2 \ldots a_j$. The various sections are assigned to different operations by storing in designated memory locations associated with them various assigned-markers or group identifiers, as appropriate. The single processor can thus operate as a number of virtual processors. If there are "R" sections of memory, for example, the P-by-Q grid 8 (FIG. 1) behaves as a P-by-Q-by-R network of processors 20, as illustrated by the R-layered network shown in FIG. 3. Each section of memory constitutes a different "layer." The memory subdivisions or layers are dynamically made according to the amount of memory required for the various assigned operations, as discussed below with reference to FIG. 8.

B. DYNAMIC ALLOCATION

Figure 4:
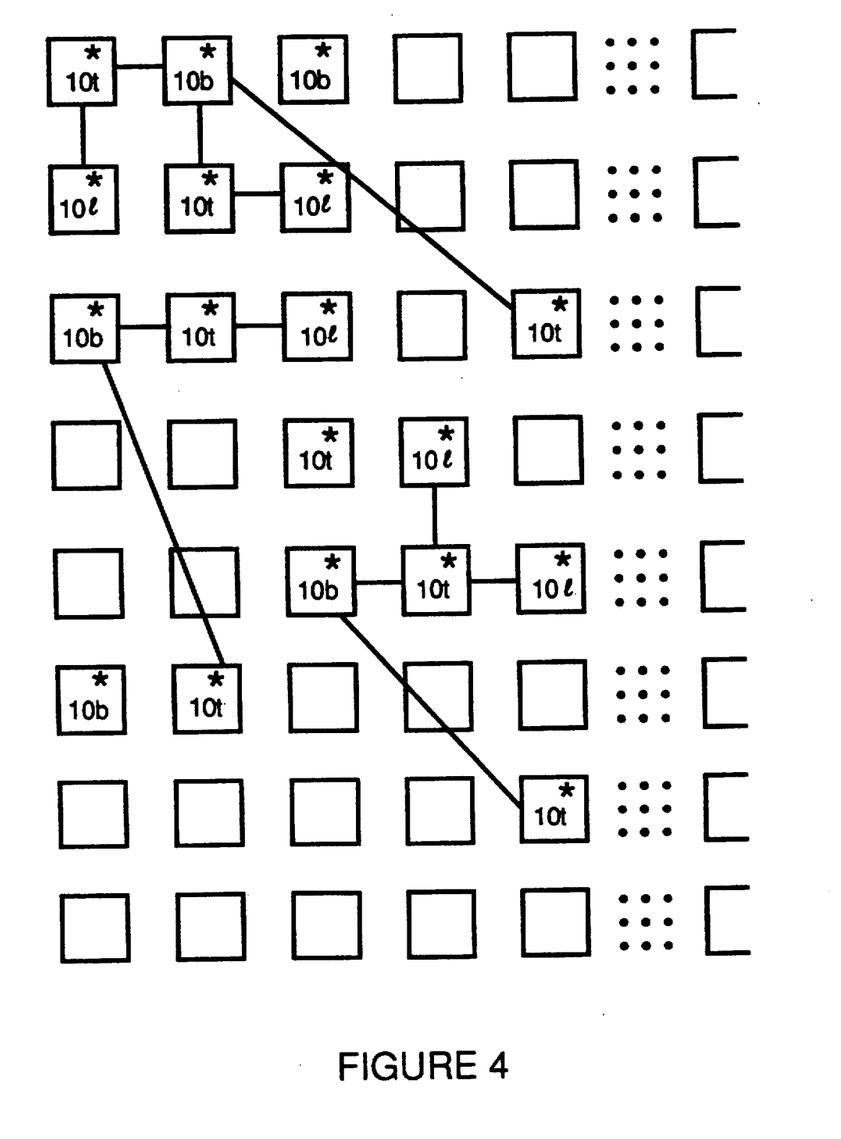
FIG. 4 is a block diagram of the grid of processors, including connected processors.

An assigned processor or a group of assigned processors, to complete an on-going operation, may require connection to one or more free processors. For example, a group of assigned processors calculating hospital bills for patients requires additional processors each time new tests are ordered. Similarly, the group associated with the new tests requires additional processors if the new tests lead to additional laboratory work, and so on. FIG. 4 illustrates connections required for billing processors 10b, processors 10t associated with testing, and processors 10l associated with laboratory work.

At the start of the billing computation operation neither the new tests nor the laboratory work were anticipated. Accordingly, processors 10t and 10l were neither reserved for these data nor connected to the billing processors 10b. Instead, each of the billing processors 10b, and then the testing processors 10t have allocated to them various free processors, as needed.

A connection is made by an assigned processor 10 sending to one or more free processors a group identifier. The free processors 10 store the received group identifier in a designated memory location, for example, location 0 in section $a_1$ (FIG. 2). This signifies that these free processors 10, or at least the associated section $a_1$ of their memories, are members of the identified group. The assigned processor 10 or a controller processor (not shown) stores, in an associated location in its own memory, variable pointers which point to the allocated processors.

1. Allocating Free Processors To Assigned Processors Using a Known Allocation Scheme Before one or more assigned processors 10 can make connections to "$t_j$" free processors, where $1 \leq t_j$, it must first be determined how many of the processors are actually free and then where in the grid 8 (FIG. 1) the free processors are located. Accordingly, a request is sent to all the processors in the system, either by a controller or a selected requesting processor, asking that the processors determine if they are free. In response, each processor 10 determines if it is free by examining its appropriate designated memory location. The processors which are free then count themselves and assign themselves numbers, using, for example, a "counting tree."

Once all the free processors have numbers, each one of them sends its address to a designated rendezvous processor associated with its assigned number. For example, the free processor assigned the number 1 sends its address to the rendezvous processor designated number 1, the free processor assigned the number 2 sends its address to the rendezvous processor designated number 2, and so forth.

The requesting processors order themselves and, based on their allocation requirements, assign themselves numbers using a known numbering scheme. Thus a first requesting processor assigns itself the number 0. If this processor requires $t_1$ free processors, the second requesting processor assigns itself the number $t_1$. If this second requesting processor requires $t_2$ free processors, the third requesting processor assigns itself the number $t_1 + t_2$, and so forth. Thereafter, the requesting processor numbered 0 sends a request to the first $t_1$ rendezvous processors, numbered 0 to $t_1$-1, and asks each of the rendezvous processors to send to it the address of the associated free processor. The requesting processor may send such requests to each of these rendezvous processors simultaneously, or it may send various requests as it requires the allocated processors for various operation steps. The requesting processor assigned number 1 sends its requests to the rendezvous processors numbered $t_1$ to $t_1 + (t_2-1)$, one such request for each free processor required, and so forth.

If there are not enough free processors in a particular layer, that is, with a particular section of memory free, to satisfy a connection requirement, the system essentially looks to another layer of processors. Thus a second request is sent to the system processors asking each of them to determine if another particular section of memory is free. The processors with this section free then count and number themselves, and send their addresses to the appropriate rendezvous processors. The rendezvous processors then send the addresses of these free processors to the requesting processors, as appropriate.

2. Allocating Blocks Of Free Processors To One Assigned Processor

An assigned processor may require connection an g-dimensional block of free processors, for example, a "d"-by-"e" block of processors, to ensure fast data transfer between and among the various connected processors. Accordingly, it utilizes a special "block identification" scheme to locate a d-by-e block of free processors. The block identification scheme for a two dimensional mesh-connected processing system is discussed below with reference to FIGS. 5-7. Such a scheme can be used for identification and allocation of blocks in a mesh-connected system of any dimension.

Figure 5:
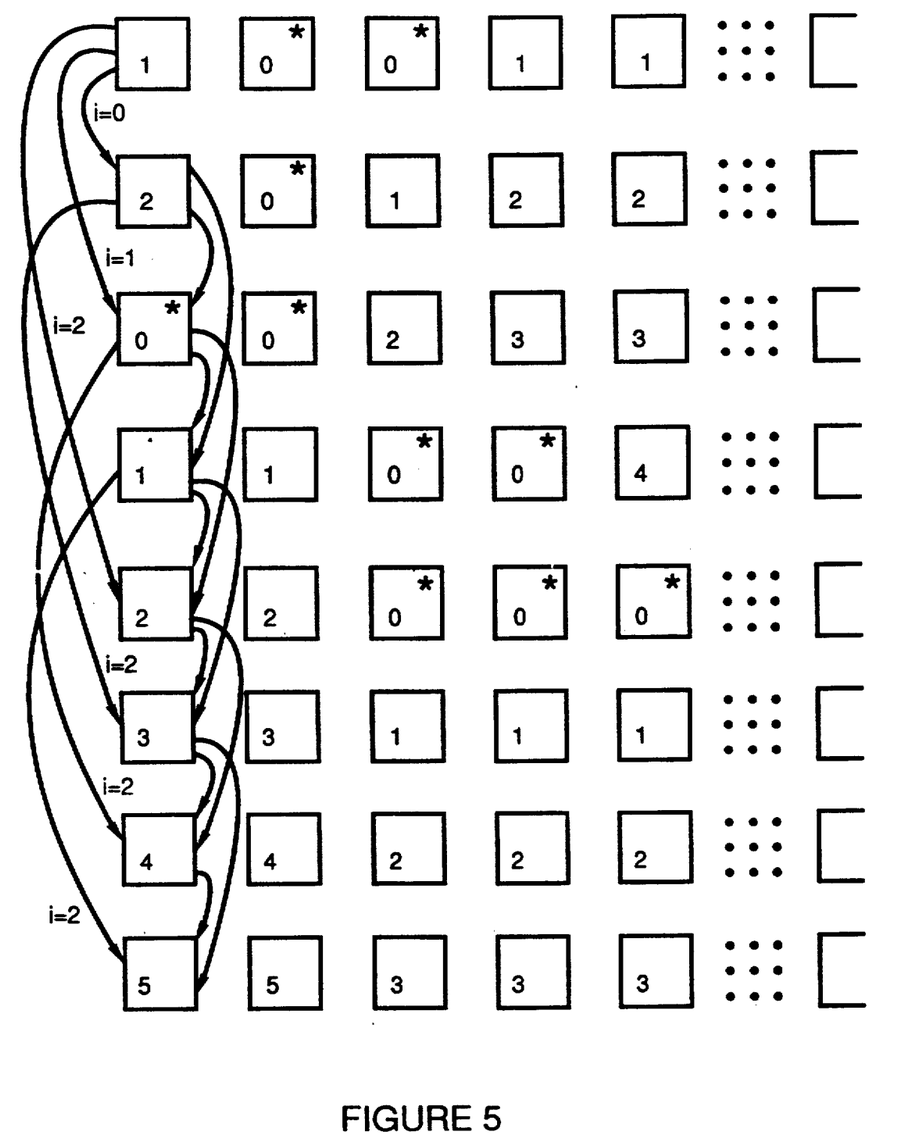
FIG. 5 is a block diagram of a grid of processors illustrating the assignment of 1-dimensional indices.

Referring now to FIG. 5, when a requesting processor requires connection to an d-by-e block of free processors, either a controller processor or the requesting processor sends a request to the system processors asking them to determine if they are free. The free processors are then instructed to label themselves in accordance with their environment, that is, in accordance with their positions relative to the other free processors. Each of the free processors gives itself n labels, one for each dimension.

In this example, each free processor gives itself two labels, namely, a first index which relates to a first dimension or orientation, for example, a "vertical" index, which is a count of the number of contiguous free processors above it, and a second index which relates to a second orientation, for example, a "horizontal" index which is a count of the number of contiguous free processors to the left of it. In the preferred embodiment, the indices also include in the count the particular processor with which they are associated. For example, the vertical index indicates the contiguous free processors in a column up to and including the associated processor.

In an n-dimensional system, each processor assigns itself n indices, one corresponding to its position in each dimension relative to the other free processors. For example, a processor in a three dimensional system assigns itself three indices, one corresponding to each of the x-,y- and z-orientations.

To determine the appropriate vertical index, the free processors use an appropriate counting scheme, leaving the indices of the assigned processors as 0's. One such scheme uses a counting tree on each column of the grid 8. Each free processor gives itself a vertical index of 1 and each assigned processor gives itself a vertical index of 0. Each processor sends a copy of its index to the processor which is $2^i$ processors below it, where "i", the iteration counter, is 0 for this "$0^{th}$" iteration. Thus each processor sends a copy of its vertical index to the processor immediately below it. If the receiving processor has an index which is greater than or equal to $2^i$, or $2^0$, it adds the received index to its own vertical index and uses the sum as its new index. If the receiving processor has an index which is smaller than $2^0$, it ignores the received index.

Each processor then performs a $1^{st}$ iteration, $i=1$, by sending its vertical index to the processor which is $2^i$, or $2^1$, processors below it. Each of the receiving processors adds the received index to its own if its index is greater than or equal to $2^i$, or $2^1$. Otherwise, the receiving processor ignores it. The processors continue performing iterations, incrementing i each time, until either all the processors in a column have accurate 1-dimensional indices or $2^i$ is greater than d, which is the corresponding dimension of the required block. The processors thus perform a maximum of log(Q) iterations, where Q is the number of processors in a column. FIG. 5 depicts the processors in the grid 8 with vertical indices.

Figure 6:
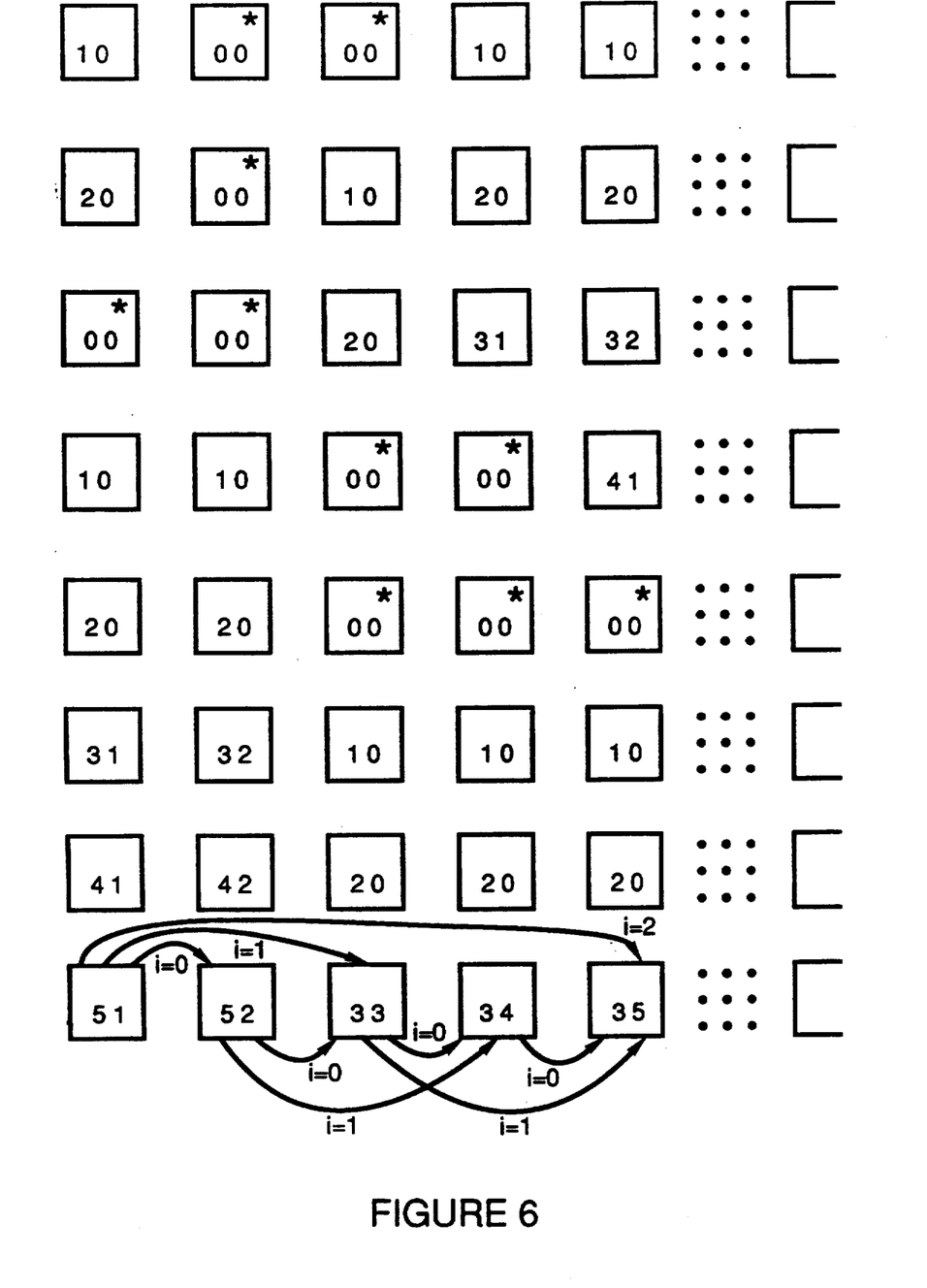
FIG. 6 is a block diagram of a grid of processors illustrating the assignment of second dimensional indices.

Referring now to FIG. 6, in order to determine the appropriate horizontal index, each assigned processor, and each processor which has a vertical index of less than d, assigns itself a horizontal index of 0. For example, if d equals 3, the processors 10 with vertical indices of 0, 1 or 2 assign themselves horizontal indices of 0. The remaining free processors assign themselves a horizontal index of 1. Each processor then sends a copy of its horizontal index to the processor which is $2^i$ positions to the right of it, where i equals 0 for this iteration, and so forth. The processors thus perform a maximum of log(P) iterations, where P is the number of processors in a row. FIG. 6 depicts the processors 10 of grid 8 with both vertical and horizontal indices for d=3.

The processors may count themselves in any direction within a particular orientation, that is, they may count themselves from bottom to top in the vertical orientation or from right to left in the horizontal orientation. The counting scheme must be consistent, however. In an n-dimensional system, the counting scheme used in the horizontal orientation is repeated n−1 times, such that each processor has indices which appropriately indicate the useful, contiguous free processors in the various orientations.

Figure 7:
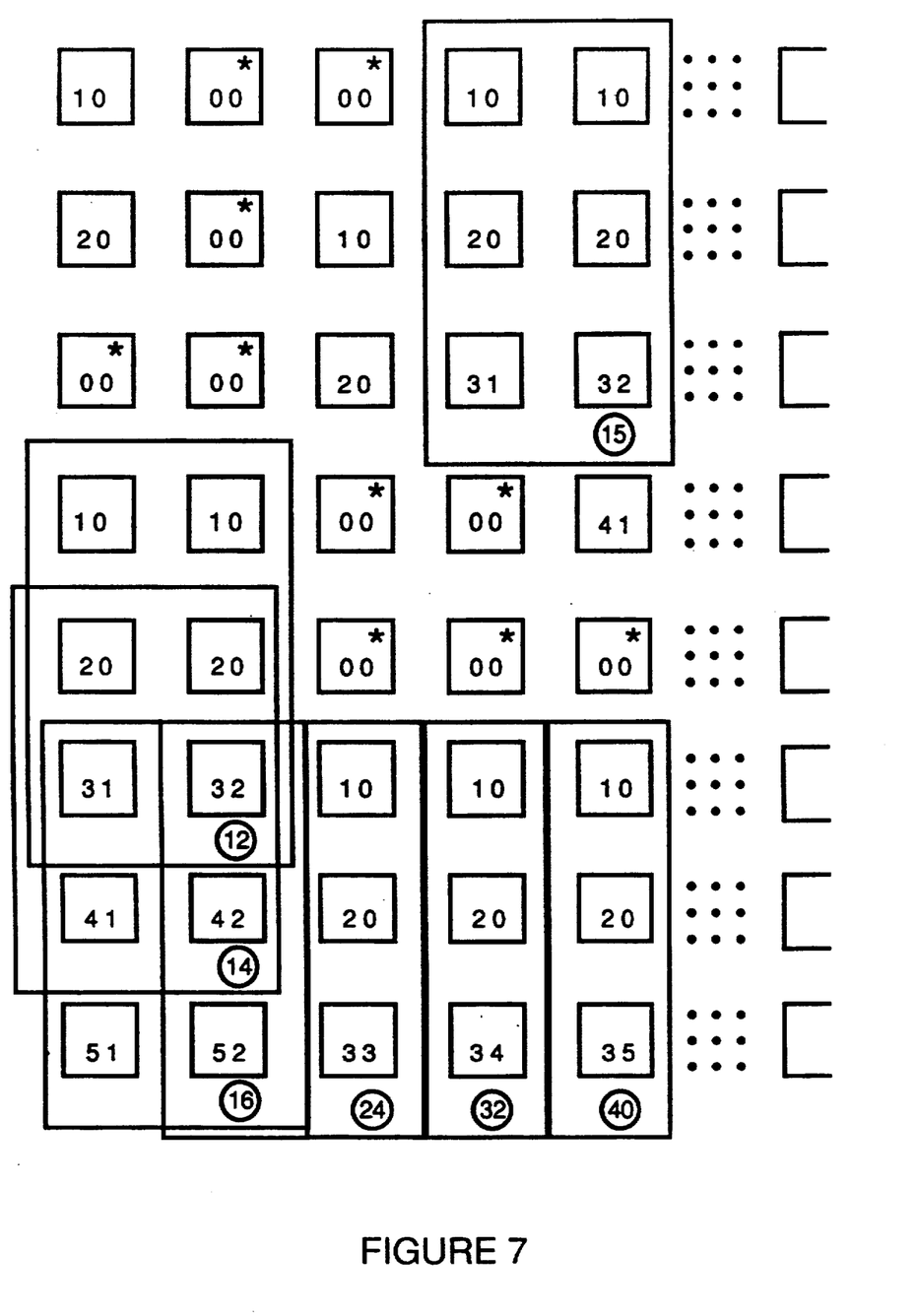
FIG. 7 is a block diagram of a grid of processors illustrating available blocks of processors.

Each processor with a vertical index greater than or equal to d and a horizontal index greater than or equal to e is a lower right-hand corner of a block which contains at least d-by-e free processors. FIG. 7 illustrates a number of such blocks for d=3 and e=2. In an n dimensional system, in which a two-dimensional block is required, each processor with a first index greater than or equal to d and any of the second to $n^{th}$ dimensional indices greater than or equal to e is a lower right-hand corner of a block.

The choice of which block to allocate to the requesting processor is based on the position of the various blocks in the system. By choosing a block close to an edge of the system, contiguous blocks in the center of the system are left for future connection. Accordingly, larger blocks may be formed from the remaining free processors than could be formed if a block in the center is chosen and free processors remain on either side of the block.

Each corner processor, and in fact, each processor in the system, has associated with it a "block index", which is based on the location of the processor in the mesh-connected network. The index is the product of the coordinates associated with the processor. The processor with the lowest block index in the network indicates the "preferred corner" of the network. For example, the processor shown in FIG. 1 which has coordinates 1,1 has a block index of 1, and this processor location is the preferred corner. The smaller the block index, the closer the block is to a predetermined edge of the network, and further, the closest along that edge to the preferred corner. Thus the corner processor with the smallest block index is associated with the block closest to the preferred corner along the predetermined edge of the network. Accordingly it is selected for allocation to the requesting processor.

The block indices of the corner processors of the blocks shown in FIG. 7 are depicted below the corner processors. The block indices of corner processors in an n dimensional system are the products of all of the coordinates associated with a processor. Thus the block index of a processor in a three dimensional system is the product of the x, y and z coordinates.

The various corner processors participate in a minimum-reduction operation to determine the smallest block index. If only one corner processor has this index, it is the block which is allocated to the requesting processor. The associated corner processor thus sends its address to the designated rendezvous processor. If more than one corner processor has the minimum block index, one of the processors is selected either at random or using some predetermined selection scheme.

4. Allocating Blocks of Free Processors to Multiple Assigned Processors

If more than one assigned processor requires connection to d-by-e blocks of free processors, non-overlapping blocks must be located. In the example, these blocks have corner processors with vertical indices which are modulo d and horizontal indices which are modulo e. The non-overlapping blocks are depicted in FIG. 7 using heavy border lines.

The corner processors of non-overlapping blocks count and number themselves, using either a conventional counting scheme or an ordering scheme which orders them by block index, with the block with the smallest block index receiving number 1 and so forth. The corner processors then send their addresses to the rendezvous processors associated with the assigned numbers.

If the layer to which the processors are then looking to determine if they are free does not include enough contiguous free processors to fulfill the connection requirements, the processors look to another layer and follow the same block identification schemes for single and non-overlapping blocks. In the preferred embodiment, processors which require blocks of free processors look for the free processors in layers in which block allocations have previously been made or in free layers. In this way, the processors avoid layers in which processors have been individually allocated, without concern for interference with potential blocks of free processors.

The non-overlapping block identification scheme may also be used when the one or more requesting processors require several free processors. Even if the requesting processors do not require particular configurations of processors, it may be faster to find and allocate the blocks than to use several rendezvous processors to allocate one free processor at a time. The requesting processor or a controller processor may then retain one pointer to the $t_i$ allocated processors, instead of $t_i$ pointers.

5. Dynamically Allocating Sections of Memory

Figure 8:
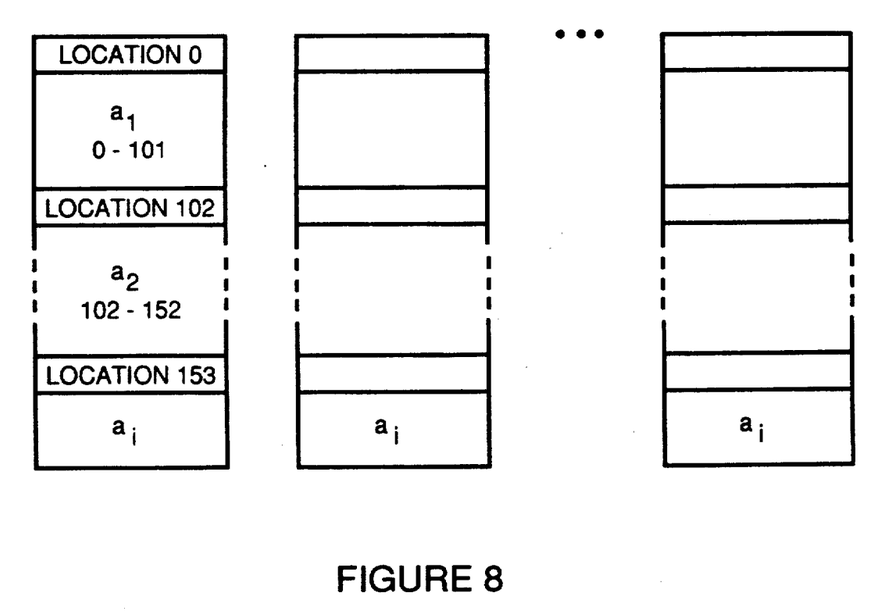
FIG. 8 is a block diagram of the memories of several processors, each with sections allocated to particular operations.

Referring now to FIG. 8, the memories 100 of a number of processors $10_1$–$10_x$ are shown. The memories 100 include various subdivisions, or sections, which allow the processors 10 to behave as layers of processors. These subdivisions are dynamically made according to the memory requirements of the various assigned operations. Some massively parallel processing systems generally require processors to address the same memory locations at the same time. These systems require that every processor have the same memory subdivisions, and thus, the same-sized layers. Systems that do not have these restrictions can allow different-sized layers in different processors, that is, different sized sections starting at the same memory locations in different processors.

In a system which requires each processor to have the same memory subdivisions, the first time a new section is allocated to a particular operation in one processor, it sets the size of the section. For example, if processor $10_2$ has section $a_2$ of its memory allocated to a requesting processor which requires 50 memory locations, the section $a_2$ extends from location 102 to location 152. Each processor thus sets its section $a_2$ to contain these memory locations. Thereafter, when a requesting processor is allocated a free processor based on a free section $a_2$, it can use all or any part of these 50 memory locations. If the requesting processor uses less than the full 50 locations, it ignores the remaining section $a_2$ locations. It can not later allocate the remaining locations for a different operation.

When a section of memory 100 is allocated, one memory location within the section is designated to hold the associated assigned marker or group identifier, for example, location 0 in section $a_1$. The processors 10 thus look to location 0 to determine if their first section is free.

When instructed to look to a second layer, a processor 10 looks to a designated location associated with a second memory section $a_2$, which starts with location 102. Thus when the processor 10 is assigned to a second requesting processor, it stores in a designated location in section $a_2$, for example, location 102, a second assigned-marker or group identifier. If the second requesting processor requires locations 102 to 152 this defines sector $a_2$ to include these locations. The next layer, or a third memory section $a_3$, then starts with location 153, and so forth.

In systems which do not require each processor to have the same memory subdivisions each processor dynamically allocates its own free memory in the same way in which a conventional serial processing system dynamically allocates memory.

Referring still to FIG. 8, memory sections may be allocated statically and dynamically, as appropriate. In the preferred embodiment, the memory is allocated from one end of memory toward the center for static allocations and from the opposite end of memory toward the center for dynamic operations. Thus the memory locations designated $a_i$ in FIG. 8 are allocated using conventional static allocation schemes and the memory sections $a_1$, and so forth are dynamically allocated.

C. MASSIVELY PARALLEL LANGUAGE EXTENSIONS

Processors may be allocated in the same way data is allocated. For example, the processors may be allocated by using standard memory allocation operations and pointing to parallel data. The addresses of processors are then returned, instead of memory location addresses. If a pointer points to a single set of parallel values, for example, a "group" in Pascal or a "dynamic domain" in C, then only a single processor is allocated for each requesting processor. If the pointer points to an array of parallel data, then an array of processors is allocated for each requesting processor, using the block allocation schemes described above.

1. Declaring Parallel Data

Parallel data are declared in dynamic groups either with or without dimensions. If dimensions are specified, then the data are allocated in blocks, where each block is the specified size. In the following:

| | |
|---|---|
| dynamic group matrix [10,10]; | declares a dynamic group with dimensions |
| dynamic group graph; | declares a dynamic group with no dimensions |
| var a, b, c,: real in matrix; | declares three variables as part of matrix |
| ptr: matrix: | declares a pointer to an instance of matrix |
| pptr: matrix in graph | declares a parallel pointer to matrix in another group | a dynamic group called "matrix" is declared which consists of a 10-by-10 array of processors, a dynamic group called "graph" is declared which has no dimensions, and the variables "a", "b" and "c" are declared as part of the group "matrix". Storage has not actually been allocated because these are dynamic groups and the allocation happens at run time. The variable "ptr" is allocated, and is a scalar pointer to an instance of the group matrix. The variable "pptr" is declared, though not allocated, as a part of the group graph.

2. Dynamic Allocation of Processors as Parallel Data

Processors are allocated using the following:

| | |
|---|---|
| new (ptr); | allocates one instance of matrix |
| select ptr   do | selects the matrix pointed to by "ptr" |
| a: = 0.0; | sets "a" to 0.0 in select elements of matrix |
| ptr [1,5].b: = 4.5 | sets "b" to 4.5 in one processor |
| select graph do | selects a different group, namely, graph |
| new (pptr); | allocates one instance of matrix for each processor in graph |
| pptr  .a: = 6.2 | sets "a" in matrix within the group graph to 6.2 |

The "new" procedure allocates an instance of the group matrix and initializes ptr to point to the allocated block of 10-by-10 processors. The next select statement activates those processors that are pointed to by ptr and assigns 0.0 to the variable a within the selected processors. The next statement selects and assigns a value 4.5 to variable b in a single processor within the group matrix. The next select statement selects all processors from the group graph and then assigns a value of 6.2 to the variable a in each of the processors pointed to by pptr.

4. Summary

The statements set forth above are examples of dynamic allocations and group operations. Many more group operations are possible in an implementation of a massively parallel processing system which explicitly uses pointers to connect requesting and allocated free processors. Such a system can perform, in parallel, computations which in a serial system would ordinarily require a large number of iterations. The system is easily programmed by a user familiar with the operation of pointers on a serial system. Thus the user can readily adapt to such a massively parallel system. Further, programs written for a serial system need only be modified to include the comparable group commands to correctly perform such operations on a parallel system.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A method of operating a multi-dimensional mesh-connected processing system which includes a plurality of processors, wherein the processors dynamically allocate contiguous "n"-dimensional configurations of available, or free, processors to request processors under the control of a system controller, the method including the steps of:
   A. at the instruction of the system controller
      i. numbering the requesting processors;
      ii. sending the addresses of the requesting processors and their connection requirements to designated rendezvous processors associated with the numbers assigned in step A. i.; and iii. sending to each of the other processors in the system, a request containing instructions which direct each of the other processors to determine if it is free;

B. each of the other processors, in response to the receipt of such a request, determining individually if it is free, and if it is free
   i. numbering itself by
      a. assigning itself a first index associated with a first dimension which indicates the number of free processors which are contiguous with it in the first dimension;
      b. assigning itself a next index associated with a particular dimension which indicates the number of free processors which are contiguous with it in the particular dimension;
      c. repeating step b for the remaining n-2 dimensions, such that each free processor has associated with it n indices; and
   ii. if it has indices which indicate that it is contiguous with a number of free processors which satisfies the connection requirement of a requesting processor sending its address and indices to the rendezvous processors;

C. each rendezvous processor, in response to the receipt of address and connection requirements from the requesting processors and address and index information from the free processors allocating to each requesting processor from which it received a connection request an n-dimensional block of free processors, the rendezvous processor sending to each of the requesting processors the address of a free processor which has indices which together are greater than or equal to the number of processors requested by that requesting processor;

each requesting processor thereafter sending to each free processor allocated to it an identifier which identifies the allocated processor as a processor assigned to a particular task.

2. The method of operating the multi-dimensional mesh-connected processing system of claim 1, wherein said method further includes the steps of:

D. under the control of the system controller, if any requesting processors do not have allocated to them free processors after the rendezvous processors allocate the available free processors, sending a second request to the other processors instructing each of the other processors to look at a particular section of its memory to determine if that section is free, and E. repeating steps B and C of claim 1 with each of the other processors which have the particular section of its memory free identifying itself as a free processor.

3. The method of operating the multi-dimensional mesh-connected processing system of claim 1, wherein
a. the step of each free processor with indices greater than or equal to the connection requirements sending address and index information to a rendezvous processor further includes
   i. each of the free processors determining an associated individual block index by multiplying together indices associated with the location of the free processor in the mesh, and
   ii. each of the free processors sending its block index together with its address to the rendezvous processor; and
b. the step of the rendezvous processor allocating free processors to a requesting processor, further includes the rendezvous processor allocating to a requesting processor the free processor with the smallest block index.

4. The method of operating the multi-dimensional mesh-connected processing system of claim 1, wherein the step of each free processor assigning itself a first index includes:
   a. each free processor assigning itself a first index of "1" and each processor which is not free assigning itself a first index of "0";
   b. each processor sending a copy of its first index to its neighbor $2^i$ processors away from it in an orientation associated with the first dimension, where "i" is the count of an iteration counter and i equals 0 for this iteration;
   c. each processor which has a first index greater than or equal to $2^i$ updating its index by adding to it the received index;
   d. incrementing the count of the iteration counter; and
   e. repeating steps a-d until i equals $$\lfloor \log_2(P) \rfloor.$$

where P is the number of processors in the orientation, corresponding to the first dimension.

5. The method operating the multi-dimensional mesh-connected processing system of claim 4, wherein the step of having each free processor assign itself a next index includes:
   a. each of the free processors with a first index which is greater than or equal to a connection requirement along a first dimension assigning itself a next index of "1" and each of the processors with a first index which is less the connection requirement along the first dimension assigning itself a next index of "0";
   b. each processor sending a copy of its next index to its neighbor $2^i$ processors away from it in an orientation associated with the next dimension, where "i" is the count of an iteration counter and i equals 0 for this iteration;
   c. each processor which has a next index greater than or equal to $2^i$ updating its next index by adding to the next index the received index;
   d. incrementing the count of the iteration counter; and
   e. repeating steps a–d until i equals $$\lfloor \log_2(P) \rfloor.$$

where P is the number of processors in the orientation corresponding to this next dimension.

6. The method operating the multi-dimensional mesh-connected processing system of claim 5, wherein the step of each free processor assigning itself a next index includes repeating steps a–e of claim 5 for each of the remaining dimensions of the required connection, wherein each free processor with assigned indices which are greater than or equal to the connection requirements in the associated dimensions assigning itself a next index of "1" in step a and each processor with any assigned indices which are less than the corresponding connection requirements in any of the associated dimensions assigning itself a next index of "0".

7. The method of operating the multi-dimensional mesh-connected processing system of claim 1, wherein the step of each free processor assigning itself a first index includes:
   a. each free processor assigning itself a first index of "1" and each processor which is not free assigning itself a first index of "0";
   b. each processor sending a copy of its first index to its neighbor $2^i$ processors away from it in an orientation associated with the first dimension, where "i" is the count of an iteration counter and i equals 0 for this iteration;
   c. each processor which has a first index greater than or equal to $2^i$ updating its index by adding to the index the received index;
   d. incrementing the count of the iteration counter; and
   e. repeating steps a–d until $2^i$ is greater than or equal to the corresponding dimension of the correction requirement.

8. The method of operating the multi-dimensional mesh-connected processing system of claim 7, wherein the step of having each free processor assign itself a next index includes:
   a each of the processors with a first index which is greater that or equal to a connection requirement along a first dimension assigning itself a next index of "1" and each of the processors with a first index which is less the connection requirement along the first dimension assigning itself a next index of "0";
   b. each processor sending a copy of its next index to its neighbor $2^i$ processors away from it in an orientation associated with a next dimension, where "i" is the count of an iteration counter and i equals 0 for this iteration;
   c. each processor which has a next index greater than or equal to $2^i$ updating its next index by adding to the next index the received index;
   d. incrementing the count of the iteration counter; and
   e. repeating steps a–d until $2^i$ is greater than or equal to the corresponding dimension of the connection requirement.

9. The method operating the multi-dimensional mesh-connected processing system of claim 7, wherein the step of each processor assigning itself a next index includes repeating steps a–e of claim 7 for each of the remaining dimensions of the required connection, wherein each processor with assigned indices which are greater than or equal to the connection requirements in the associated dimensions assigning itself a next index of "1" in step a and each processor with assigned indices which are less than the corresponding connection requirements assigning itself a next index of "0".

10. The method operating a multi-dimensional mesh-connected processing system of claim 3, wherein the step of the other processors sending their block indices to a rendezvous processor includes having only the processors with indices which are modulo the required corresponding dimension of the connection requirement send their block indices and addresses to the rendezvous processor.

11. The method of operating the multi-dimensional mesh-connected processing system of claim 3, wherein the step of the other processor sending its block index to a rendezvous processor further includes the step of each of the other processors with a block index comparing its block index with the block indices of other processors and numbering itself in correspondence with the relative value of its index and sending its number to the rendezvous processor along with its address.

12. The method of operating the multi-dimensional mesh-connected processing system of claim 10, wherein the step of the other processor sending its block index to the rendezvous processor further includes the step of each of the other processors with a block index comparing its block index with the block indices of the other processors and numbering itself in correspondence with the relative value of its index and sending its number to the rendezvous processor along with its address.

13. A method of operating a massively parallel processing system which includes a plurality of processors, wherein said processors dynamically allocate contiguous d-by-e blocks of available, or free, processors to requesting processors which require access to additional processors, the method including the steps of:
   A. the requesting processors
      i. numbering themselves;
      ii. sending their addresses to designated rendezvous processors associated with the numbers assigned in step A.i; and
      iii. sending a request to the other processors in the system instructing the other processors to determine if they are free;
   B. each of the other processors, in response to the receipt of a request
      i. determining if it is free;
      ii. if it is free assigning itself vertical and horizontal indices which indicate the number of free processors which are contiguous with it in the vertical and horizontal directions, respectively;
      iii. the other processors which have vertical indices which are multiples of "d" and horizontal indices which are multiples of "e" determining the product of their individual vertical and horizontal indices; and
      iv. each of those with a product sending its address and product to the rendezvous processors;
   C. each of the rendezvous processors:
      i. allocating a block of free processors to each requesting processor, the block being associated with a free processor which sent the product and address information;
      ii. sending to each requesting processor the addresses of the free processors allocated to it;
the requesting processors thereafter sending to the free processors allocated to them identifiers which identify the allocated processors as processors assigned to a particular task.

14. The method of operating a massively parallel processing system of claim 13, wherein the step of each processor assigning itself a vertical index includes:
   a. each free processor assigning itself a vertical index of "1" and each processor which is not free assigning itself a vertical index of "0";
   b. each processor sending a copy of its vertical index to its neighbor $2^i$ processors below it, where "i" is the count of an iteration counter and i equals 0 for this iteration;

c. each processor which has a vertical index greater than or equal to $2^i$ updating its index by adding to it the received index;

d. incrementing the count of the iteration counter; and e. repeating steps a-d until i equals $$\lceil \log_2(P) \rceil,$$

where P is the number of processors in the vertical orientation.

15. The method of claim 13, wherein the step of each processor assigning itself a horizontal index includes:

a. each processor with a vertical index which is greater than or equal to "d" assigning itself a horizontal index of "1" and each of the other processors assigning itself a horizontal index of "0";

b. each processor sending a copy of its horizontal index to its neighbor $2^i$ processors away from it in the horizontal orientation, wherein "i" is the count of an iteration counter and i equals 0 for this iteration;

c. each processor which has a horizontal index greater than or equal to $2^i$ updating its index by adding to the index the received index;

d. incrementing the count of the iteration counter; and e. repeating steps a-d until equals $$\lceil \log_2(P) \rceil,$$

where P is the number of processors in the horizontal orientation.

16. A method of operating an "n"-dimensional mesh-connected processing system which includes a plurality of processors, wherein the processors dynamically allocate contiguous "n"-dimensional configurations of free processors to a requesting processor by:

A. the requesting processor sending a request to the other processors in the system instructing the other processors to determine if they are free;

B. each of the other processors which are free, in response to the receipt of a request, assigning to itself a first index corresponding to a predetermined first orientation, the index indicating the number of contiguous free processors preceding and including that processor in a predetermined ordering of the processors in the first orientation;

C. each of the other processors with a first index which is greater than or equal to the corresponding dimension of the required configuration, assigning to itself a second index corresponding to a second orientation, the second index indicating the number of contiguous free processors preceding and including that processor in a predetermined ordering of the processors in the second orientation;

D. each of the other processors with a previous index which is greater that or equal to the corresponding dimension of the required configuration, assigning itself a next index corresponding to a next orientation, the next index indicating the number of contiguous free processors preceding and including that processor in a predetermined ordering of the processors in the corresponding orientation;

E. each of the other processors repeating step D for each of the remaining n dimensions;

F. each of the processors with a first index that is equal to or greater than the corresponding dimension of the required configuration and n indices which are equal to or greater than the other dimensions of the required configuration determining a block index, which is the product of coordinates associated with the processor based on its location within the mesh;

G. each of the processors with a block index determining which of the processors has the smallest block index;

H. the processor with the smallest block index sending its address to a rendezvous processor which is associated with the requesting processor; and I. the rendezvous processor allocating a block to the requesting processor by sending to it the address of the processor with smallest block index.

* * * * *